United States Patent [19]

Dickinson

[11] Patent Number: 4,714,032
[45] Date of Patent: Dec. 22, 1987

[54] POLLUTION-FREE PRESSURIZED COMBUSTION UTILIZING A CONTROLLED CONCENTRATION OF WATER VAPOR

[75] Inventor: Norman L. Dickinson, Monte Sereno, Calif.

[73] Assignee: Dipac Associates, Monte Sereno, Calif.

[21] Appl. No.: 813,486

[22] Filed: Dec. 26, 1985

[51] Int. Cl.[4] .............................................. F23D 1/00
[52] U.S. Cl. .................... 110/347; 110/348; 110/238; 122/7 C; 431/4; 60/39.05; 60/39.464
[58] Field of Search .............. 110/238, 347, 348, 106; 122/4 R, 7 C; 431/4; 60/39.05, 39.46 S

[56] References Cited

U.S. PATENT DOCUMENTS

4,377,066 3/1983 Dickinson .......................... 60/39.05
4,380,960 4/1983 Dickinson .......................... 122/7 C Primary Examiner—Allen M. Ostrager

[57] ABSTRACT

In a continuous pressurized process for the combustion, in the presence of steam and alkali, of solid fuels charged as aqueous slurries, the improvements comprising the elevation of inlet zone temperature in an entrained phase reactor by recirculating hot solid products to the zone, maintaining increased temperature and/or reduced steam partial pressure in the reactor and/or utilizing contaminated water from an associated fuels processing apparatus as a source of slurry and/or reactor temperature control water. An embodiment suitable for a coal-fired gas turbine locomotive is described and illustrated.

18 Claims, 3 Drawing Figures

POLLUTION-FREE PRESSURIZED COMBUSTION UTILIZING A CONTROLLED CONCENTRATION OF WATER VAPOR

CROSS-REFERENCE TO RELATED APPLICATIONS

This application concerns improvements to the inventions of U.S. Pat. Nos. 4,377,066 and 4,380,960. For convenience, these references are referred to in this application as Patents A and B, respectively.

BACKGROUND OF THE INVENTION

In the very extensive art of solid fuel combustion, reference is frequently made to the desirability of having the fuel as dry as possible. The higher the moisture (water) content the more difficult it is to ignite. Usually, the heat required to vaporize fuel moisture is lost, detracting from that available for useful purpose. This loss, in turn, lowers combustion (flame) temperature. Although, as a necessity or convenience, many fuels, such as forestry and agricultural wastes, are burned in a wet condition, it is with the knowledge that much of their potential energy will be wasted. To dispose of some high moisture wastes, such as garbage and sewage sludge, it is often necessary to fire expensive auxiliary fuels, such as oil or gas, to achieve a temperature high enough to complete the combustion.

Generally speaking, a high combustion temperature is considered desirable in the interest of complete combustion. Based on thermodynamic theory, high temperature heat is considered more valuable than lower temperature heat, even though it is commonly released at a temperature (ca. 2700° F.) some 2000° F. higher than the temperature (usually below 700° F.) at which most of it will be utilized to generate steam.

The usual high combustion temperatures are not without drawbacks: the apparatus must be constructed of expensive materials capable of withstanding them. Ash components frequently melt or sinter, forming deposits which foul heat transfer surfaces, obstruct gas passages and damage refractory linings. Fuel sulfur burns to sulfur dioxide while fuel nitrogen and some atmospheric nitrogen is converted to nitrogen oxides. Sulfur and nitrogen oxides are strongly implicated as major sources of the "acid rain" which is damaging forests and lakes, particularly in northeastern states.

Since man's earliest campfire, solid fuels have been burned almost exclusively at atmospheric pressure. On the small scale this is simple and logical. On the large scale, volumes of air and flue gas become unreasonably great. A 300 Megawatt (MW) boiler, not particularly large by present standards, produces a million cubic feet of flue gas per minute. Consequently, the combustion space needs to be a huge gallery, with all the structure necessary to support it, and the enormous flow of flue gas carries a proportionate burden of fly ash. When emissions controls consisted mainly of a tall stack, such volumes were perhaps tolerable.

But, when environmental awareness made it necessary to filter or precipitate out most of the fly ash, and chemically absorb most of the sulfur dioxide, large scale atmospheric combustion became outdated. Low pressure is not only responsible, in large measure, for the sulfur dioxide but makes it absurdly difficult to remove.

There is an unwritten law in the chemical process industries to the effect that one should never process a gas at low pressure, if it can possibly be avoided. Equipment sizes and energy losses are excessive and entrainment nearly unmanageable. Conventional flue gas desulfurization is an unfortunate illustration of that law. Termed by The Electric Power Research Institute (EPRI) "The Technology Nobody Wanted", its expense, energy waste and operating and maintenance headaches are almost universally deplored. The stand-off on acid rain legislation at the time of this application testifies to the widespread resistance to more of this unsatisfactory expedient.

There is somewhat less complaint about the costs of particulate control. Precipitators and baghouses, the devices used to recover fine ash particles, are satisfactory only by comparison with disulfurization. They are large and expensive (because of the low pressure) and consume substantial energy. The tighter particulate emission regulations which are in prospect will make this step even more costly.

A vast labyrinth of ducts, often large enough to drive a truck through, is needed to connect atmospheric boilers with their emissions control systems and stack. Ductwork, alone, for a 300 MW boiler has been estimated to cost $10 million.

Time honored methods of handling solid fuels are pretty much taken for granted, perhaps because thought inevitable. Actually, the numerous mechanical steps from mine to boiler aggregate serious losses, weathering, leaching, labor and energy consumption and production of dust and noise. In fact, they are a major contributor to coal's old fashioned, dirty image.

But the venerable beliefs about solid fuels are being challenged on a broad front. Water is being deliberately mixed with coals to form a liquid Coal-Water Fuel (CWF) (also known as Coal-Water Slurry (CWS) and Coal-Water Mixture (CWM)). Atmospheric Fluidized Bed Combustions (AFBCs) are bringing combustion temperatures down to 1500°-1600° F. (without appreciable efficiency loss) and experimental Fluidized Bed Combustors have been operated at pressures up to 235 pounds per square inch (psi) (PFBCs).

The original stationary form of fluidized bed, or "bubbling-bed", is receiving stiff competition from a new version, Circulating Fluidized Bed Combustors (CFBCs), with which combustion takes place in a relatively high velocity (entrained phase) up-flow reactor which discharges into a hot cyclone separator. Solids (mainly ash and limestone) separated from flue gas are recycled to the base of the reactor, where they mix with incoming fuel and air.

Ground limestone is added to both types of fluidized beds to react with sulfur dioxide. Excess limestone of 50–150 percent is required to remove about 90 percent of the sulfur, sufficient to comply with liberal 1985 emission regulations.

Also, ground limestone is being mixed with air and fuel in specially designed Limestone Injection Multistage Burners (LIMB) and, alternatively, injected into the flue gas stream at various points during its passage through the convection sections of boilers. In such cases, spent and excess limestone is generally recovered dry along with fly ash. A considerable excess is required to achieve sulfur removals of the order of 60 percent.

Although circulating fluidized beds are relatively new in the solid fuel-fired boiler scene, they are quite old as apparatuses for gas-solids contacting. Fluidized bed catalytic cracking units, employing a high solids recirculation between reactor and regenerator, go back to the early 1940's. By the 1950's, circulating fluidized beds with high velocity (entrained phase) reaction zones were being installed at the Sasol synthetic fuels plant in South Africa. About the same time, fluidized "cat crackers" began moving toward high velocity reaction zones, termed "transfer line" or "riser" reactors.

As a by-product of the petroleum conversion taking place in a cat cracker reactor, coke (often called "carbon") is laid down on the fluidized catalyst. This carbon is burned off spent catalyst in the regenerator which is, in fact, a fluidized bed combustor. The regenerator of a heavy oil cat cracker at the Saber refinery in Corpus Christi, Tex., which burns about 750 tons/day of carbon, is the largest fluidized bed combustor in operation at the time of this application.

Commercial CFBCs have operated since 1979. Versions of this combustion apparatus are offered by at least 25 contractors. Except for minor improvements, it is considered public domain.

Rail transport of solid fuels from source to point of use adds substantially to their cost. For many years an attractive alternative has appeared to be pipeline transport as a slurry in water. There is one successful U.S. coal slurry pipeline but the technique has not fulfilled its early promise. Besides political and legal obstacles, the costly and inefficient steps of dewatering and drying are conventionally entailed, and the contaminated slurry water presents a disposal problem.

Pipeline experience has been with unstabilized slurries containing about 50 percent water whereas the CWFs, being fired experimentally, are limited to 25-30 percent water and require stabilizers.

Although conventional combustions convert sulfur in the fuel predominently to sulfur dioxide, a small amount of the trioxide is sometimes present in flue gas as discharged. It is customary, therefore, to refer to sulfur oxides for which the shorthand symbol is $SO_x$. Nevertheless, total $SO_x$ is accounted for as if it were all sulfur dioxide. Similarly, nitrogen oxides, or $NO_x$, are composed primarily of nitrous oxide (NO) and nitrogen dioxide ($NO_2$). Since the latter predominates, $NO_x$ is accounted for as if it were all the dioxide. When $SO_x$ and $NO_x$ are specified in parts per million (ppm) this measurement is on a volumetric (molar) basis.

At the time of this application the New Source Performance Standards enforced by the Environmental Protection Agency (EPA) permit $SO_x$ emissions of 1.2 lbs/Million British Thermal Units (MBtu) and, in most cases, require 90 percent removal. The corresponding $NO_x$ emissions allowable are 0.5 lbs/MBtu for subbituminous coal and 0.6 lbs/MBtu for bituminous coal. Expressed as ppm in dry flue gas, the EPA maximums vary somewhat with heating value and excess air, but are roughly 4–500 ppm for both $SO_x$ and $NO_x$. Environmentalists and EPA favor substantial tightening of the regulations and EPA has advanced a $NO_x$ "target" of 150 ppm.

Total U.S. emissions of $SO_x$ and $NO_x$ are estimated to be 20 Million Tons per year (MT/yr) and 10 MT/yr, respectively. Bills before the Congress in 1984 and 1985 had the objective of forcing a reduction in the sum of these emissions from 30 to 20 MT/yr.

SUMMARY OF THE INVENTION

Carbonaceous fuel is ground or pulverized and mixed with water and/or aqueous recycle to form an aqueous slurry. If the fuel contains a significant amount of sulfur, the alkali content of the slurry is adjusted to a level in excess of the chemical equivalent of the sulfur as alkali sulfate. Generally, ground limestone is the alkali added. The slurry is pumped, preheated and charged, along with the combustion air (or other oxygen-containing gas), to a pressurized combustion zone maintained at a temperature above the critical temperature of water (705.4° F.). Additional water, which may be in the form of an aqueous condensate from downstream portions of the apparatus, which condensate may contain particles of ash, alkali and spent alkali, may also be charged to the combustion zone.

Effluent from the combustion zone discharges into a cyclone separator, which may be inside the pressure shell containing the combustion zone, or adjacent to it. Solid products separated in the cyclone, comprising particles of ash, alkali, spent alkali and small amounts of unconverted fuel, may be discharged from the apparatus as products of the process. However, in a preferred embodiment, a major portion of the separated solids is recycled to the inlet of the combustion zone.

Solid products may be withdrawn from the pressurized apparatus by means of a plurality of lock hoppers, according to known art. A preferred method comprises mixing the pressurized solids with aqueous condensate from downstream portions of the apparatus, displacing gas accompanying the dry solids back into the pressurized apparatus, before depressurizing the resulting slurry.

Some of the heat liberated in the combustion zone is utilized to vaporize fuel slurry water. The remainder of the heat which must be absorbed to limit combustion temperature to a predetermined maximum is extracted through heat transfer surface in the combustion zone, or absorbed by latent heat of recycled water or slurry, or by a combination of both methods. Useful heat is then recovered from the hot gaseous products leaving the cyclone separator. Higher level heat may be transferred for such purposes as superheating steam, reheating dehydrated flue gas, generating steam, in some cases preheating combustion air and/or supplying process heat. In the latter stages of heat recovery the dewpoint is reached and liquid water condenses from combustion products. Fine solid particles, unseparated by the cyclone separator (fines), are wetted and transferred to the aqueous phase.

Some of the fines slurry may be recycled to the combustion zone. The net production may be subjected to heat recovery, as to preheat fuel slurry or, alternatively, mixed with net solids from the cyclone separator, before heat recovery. In either case, the cooled slurry is depressured and subjected to conventional methods of disposal. After separation of solids, some of the aqueous component may be used as fuel slurry water.

Wet flue gas separated from condensed water may be further cooled and dried, as by counter-current contact with circulating water. Heat so transferred to the water may be utilized, for example, to reheat flue gas and preheat boiler feedwater. When system pressure justifies, preheated flue gas, which may be heated further by exchange with hot gaseous products, is expanded through turbines which drive the air compressors. Energy production may be primarily as superheated and/or saturated steam or, alternatively, some of the combustion heat may be employed to reheat flue gas to a temperature such that the turbines yield a surplus of power for export.

The present improvements, relative to Patents A and B, comprise the use of a circulating fluidized bed combustion reactor, combining features of the entrained phase reactors of Patent B and the fluidized bed reactors of Patent A, and/or the extension of combustion temperature range to 2100° F. and/or the utilization of reduced water vapor concentrations in the combustion zone, down to a partial pressure of one atmosphere.

An object of the invention is to provide an improved means of obtaining heat and power from coal and other carbonaceous fuels, without polluting the atmosphere. Another object is to improve the economics of utilizing fuels with high contents of sulfur, ash and/or moisture. A further object is to provide the boiler operator increased flexibility toward alternative fuel sources. A further object is to provide an improved means of withdrawing fluidized solids from a pressurized apparatus. A further object is to provide an economical means of producing clean, hot, pressurized flue gas or flue gas-steam mixtures for driving gas turbines delivering mechanical energy. A further object is to provide, from low cost solid fuels, an improved means of providing steam, pressurized flue gas-steam or carbon dioxide-steam mixtures for enhanced oil recovery. A further object is to provide an improved means of purifying contaminated waste waters concurrently with supplying heat and/or power. A related object is to provide an improved means of recovering the heating value of fuel delivered by slurry pipeline. Additional objects will be apparent from a consideration of the drawings and explanations thereof.

DESCRIPTION OF PREFERRED EMBODIMENTS

Figure 1:
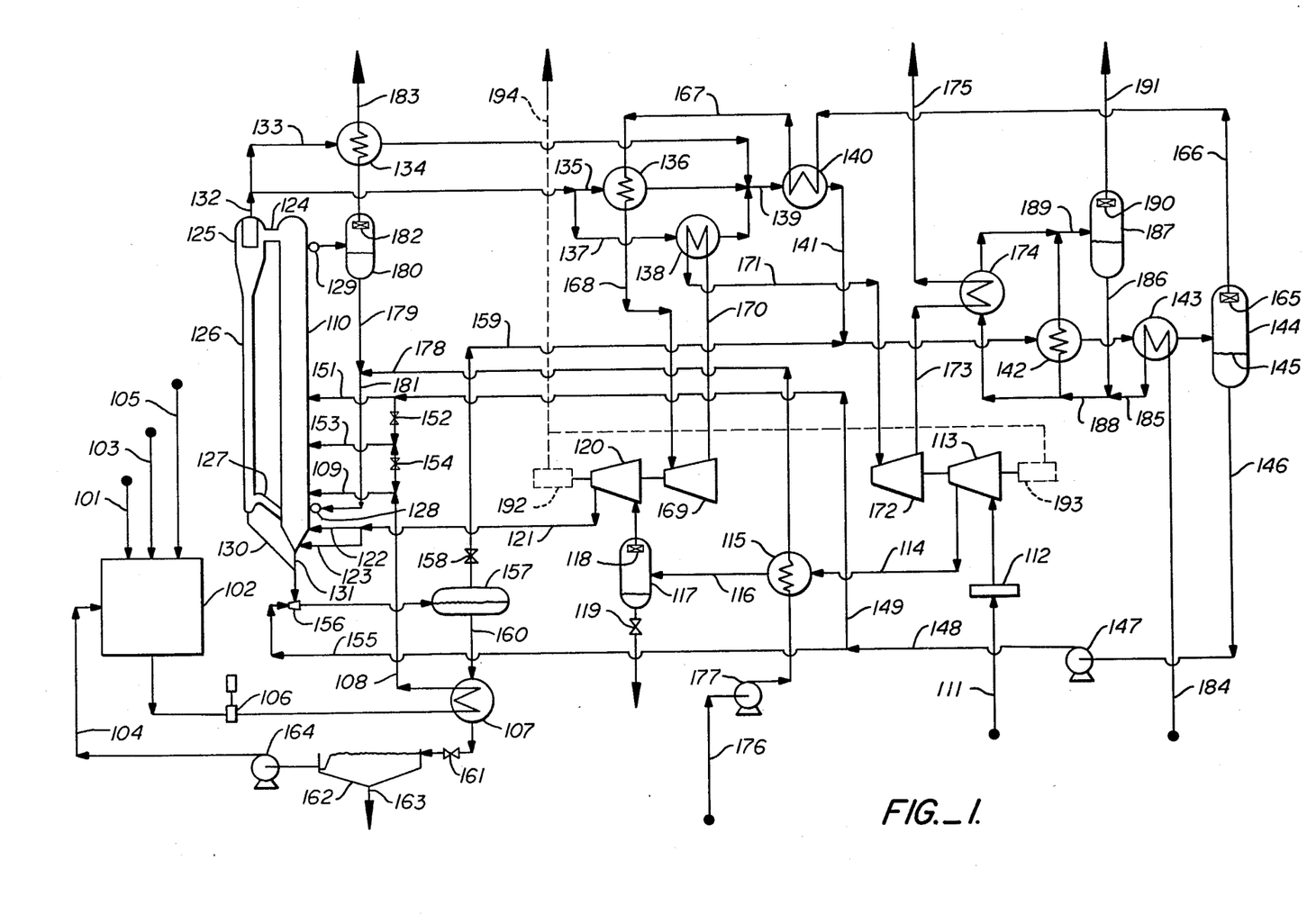
FIG. 1 is a schematic elevational diagram of an embodiment of the invention utilizing a Circulating Fluidized Bed reactor, capable of delivering energy as high pressure superheated steam, low pressure saturated steam and, optionally, electricity.

With reference to FIG. 1, solid fuel from a suitable source is supplied through a conduit 101 to a conventional grinding and slurrying system 102 in which it is mixed with water coming from a suitable storage facility through a line 103 and recycled solution entering by means of a line 104. Ground, slurried or dissolved alkali is added to the mixture via a conduit 105. A fuel slurry charge pump 106 draws the resulting alkalized slurry from the system 102 and provides sufficient pressure to cause it to flow through a slurry preheat exchanger 107 and via a line 108 and a line 109 to an elongated entrained phase combustion reactor 110. The preheated slurry enters the reactor 110 near its lower end (inlet zone).

Atmospheric air is drawn through a conduit 111 and a conventional filter 112 (to protect the apparatus from airborne solids) to the suction of a first stage air compressor 113, which delivers it hot and at an elevated pressure through a line 114 to an intercooler 115, in which it is cooled by indirect exchange with primary feedwater.

Atmospheric air contains a variable amount of water vapor (humidity). Most of the water vapor carried by the air drawn into the apparatus condenses to liquid water in the intercooler 115 and is discharged with the cooled air into a line 116. This water is separated from the air in a second stage compressor suction drum 117 and a mist extractor 118 and removed from the apparatus through a valve 119.

From the mist extractor 118 the partially compressed air flows to the suction of a second stage air compressor 120 which delivers it hot and at a further increased pressure to a line 121 which supplies primary air to the combustion reactor 110 through connections 122 and 123 and secondary air, if required, through a connection (not shown) above the fuel slurry inlet line 109.

The temperature in the inlet zone of the reactor 110 is such that fuel slurry water immediately vaporizes so that fuel and alkali particles become entrained in the upflowing air and water vapor, along with a comparatively large quantity of hot recycled solids. Combustion of fuel particles proceeds rapidly as the gas-solids mixture flows at relatively high, turbulent flow, velocity through the reactor 110. Heat transferred from the mixture to a ring of vertical tubes lining the reactor 110, and containing boiling feedwater, plays a major role in preventing the reactor contents from exceeding a predetermined temperature. The heat transfer tubes (not shown) are supplied with hot feedwater by a feedwater manifold 128 and discharge a mixture of feedwater and steam into an outlet manifold 129.

Upon reaching the outlet of the reaction 110, the reactor effluent flows through a crossover 124 to a hot cyclone separator 125. In the separator 125 centrifugal force causes most of the solid particles in the effluent to disengage from gaseous products and fall by gravity into a standpipe 126. Solids flow down the standpipe 126 in relatively dense phase, producing a pressure at the bottom somewhat above that existing at a similar level of the reactor 110. This pressure differential causes a major portion of the solid particles to flow via a seal, or trap, 127 to the inlet zone of the reactor 110 where it mixes with and heats incoming air and fuel slurry. The seal 127, which may have connections (not shown) to inject aeration air from the line 121, serves to prevent combustion air from bypassing the reactor 110, by way of the standpipe 126, during startup or under upset conditions.

Gaseous products, containing only fine solid particles unseparated by the cyclone 125, leave the reaction system through a manifold 132. The manifold 132 supplies the hot gases as heating media, via a line 133, to a steam superheat exchanger 134 and, via a line 135, to a secondary first stage flue gas reheat exchanger 136 and, via a line 137, to a second stage flue gas reheat exchanger 138. Having been cooled in the exchangers 134, 136 and 138, gaseous products are recombined in a manifold 139 and flow to a primary first stage flue gas reheat exchanger 140. After giving up additional sensible heat in the exchanger 140 the cooled gaseous products flow via a line 141 to a secondary boiler 142 in which they are cooled below their dewpoint, transferring sensible heat and latent heat of water vapor to boiling feedwater.

Gases remaining uncondensed after passing through the boiler 142 (wet flue gas), together with the condensed water and fine particles of ash and spent alkali, flow to a secondary feedwater heater 143 in which exchange with secondary boiler feedwater further cools and dehydrates the wet flue gas, condensing additional water and washing from it any remaining solid particles. The resulting flue gas, together with water condensed in both the boiler 142 and the heater 143, carrying the wetted particles, known as fines slurry, is discharged into a flue gas separator 144.

In the separator 144 gravity causes the fines slurry to separate and collect in the bottom, forming a fines slurry level 145. This level is held within the proper operating range by withdrawing the net fines slurry production through a line 146, a pump 147 and lines 148 and 155 to an eductor 156, to which is also directed the net production of ash and spent alkali withdrawn from the standpipe 126 through a line 130, and/or from the base of the reactor 110 through a line 131. In addition to the net production, the pump 147 and the line 148 may also supply fines slurry to the reactor 110 through a line 149 as internal recycle, entering the reactor 110 by means of an inlet connection 151. Alternatively or additionally, recycle may be routed to the reactor through a valve 152 and inlet connection 153 and/or through a valve 154 to mix with preheated fuel slurry in the line 109. These recycle injection locations are illustrative. In a given case, more or fewer locations may be specified.

The eductor 156 mixes the dilute fines slurry with the ash and spent alkali, which also carry with them from the reaction system gases which cause them to be in a fluidized state. The gases flow as bubbles with the combined slurry to an ash slurry deaeration drum 157. In the drum 157 gravity causes the gas bubbles to disengage from the liquid slurry and join to form a continuous gaseous phase in the upper part of the drum 157, from which they are vented under control of a vent valve 158 and via a line 159 to a suitable point in the heat recovery section of the apparatus, such as to the line 141.

Ash slurry, from which gas bubbles have been largely disengaged, leaves the deaeration drum 157 via a line 160 and the fuel slurry preheat exchanger 107, transferring therein a major portion of its sensible heat to fuel slurry on its way to the reactor 110. The level in the drum 157 is controlled, and proper pressure in the ash slurrying abd cooling apparatus maintained, by a letdown valve 161, which discharges depressured, cooled ash slurry into a settler 162, in which gravity causes the solid particles to concentrate in a conical bottom section. Slurry concentrated to the desired extent is withdrawn from the apparatus through a line 163. Salts dissolved in the water remaining with the ash comprise a purge, serving to prevent excessive accumulation in the system. The aqueous liquid in the upper section of the settler 162, from which most of the solids have been separated, is pumped by a recycle pump 164 through the line 104 to the grinding and slurrying system 102 as external recycle. If it is preferrable, in a particular case, to dispose of ash and purge separately, ash may be concentrated to a maximum extent in the settler 162 and purge diverted from the line 104 by means of a connection not shown.

Cooled and dehydrated flue gas leaves the top of the separator 144 through a mist extractor 165, to free it of entrained water droplets, and is then reheated, successively, by partially cooled gaseous products in the exchanger 140 and hot gaseous products in the exchanger 136. The reheated flue gas is then delivered through a line 168 to be expanded through a first stage flue gas turbine 169 which delivers mechanical energy, in the form of shaft horsepower, to the second stage air compressor 120.

Having been cooled by giving up energy in the turbine 169, the partially expanded flue gas is reheated by hot gaseous products in the exchanger 138. The reheated flue gas is then delivered through a line 171 to be expanded a second time through a second stage flue gas turbine 172 which delivers mechanical energy, in the form of shaft horsepower, to the first stage air compressor 113.

Having been partly cooled by giving up energy in the turbine 172, the fully expanded flue gas, now at a pressure only slightly above atmospheric, flows via a line 173 to a waste heat boiler 174, operating in parallel, in respect to water and steam, with the secondary boiler 142. Transfer of heat to boiling feedwater in the waste heat boiler 174 completes the cooling of the flue gas which is then released, through a suitable vent 175, to the atmosphere.

Although, as shown, the waste heat boiler 174 is arranged to generate low pressure steam, flue gas exhausted by the turbine 172, under some conditions of operation, may be hot enough to generate a useful amount of high pressure steam, in which case the waste heat boiler 174, or a section of it, would operate in parallel with the wall tubes of the reactor 110.

High quality boiler feedwater is supplied from outside the apparatus through a line 176, and given sufficient pressure by a primary boiler feewater pump 177 to cause it to flow through the intercooler 115, in which it is heated by indirect exchange with intermediate pressure compressed air, and then flows via a line 178 to join feedwater recirculated via a line 179 from a high pressure steam drum 180. The combined stream flows, via a line 181, to the manifold 128. Water from the manifold 128 is partially vaporized in the reactor tubes by indirect water transfer from reactor contents, the resulting steam-water mixture being collected in the outlet manifold 129 and discharged to the steam drum 180.

In the drum 180 steam is separated from water and leaves through a mist extractor 182, which purifies it of entrained droplets on its way to the steam superheat exchanger 134, in which it is superheated by hot gaseous combustion products before leaving the apparatus through a line 183.

Dissolved solids brought into the apparatus with the cold feedwater tend to accumulate in the water in the drum 180 and have to be purged from the system through a blowdown connection (not shown). Blowdown water is suitable for internal recycle, fuel slurry preparation or secondary boiler feedwater make-up.

Secondary boiler feedwater is supplied from outside the apparatus, under pressure from an offsite pump, through a line 184, to the secondary feedwater heater 143 in which it is heated by indirect transfer from wet flue gas and condensate leaving the secondary boiler 142. The heated feedwater in a line 185 is joined by water recirculated through a line 186 from a secondary steam drum 187. The combined feedwater divides, part receiving heat in the boiler 142 from cooling and condensing combustion products, some of the water being converted to steam. The balance of the combined feedwater is partially vaporized by heat transferred from expanded flue gas in the waste heat boiler 174. Steam-water mixtures from the boilers 142 and 174 flow through a line 189 to the steam drum 187 in which a separation is performed between water, which recirculates via the line 186, and steam, which passes through a mist extractor 190 and leaves the apparatus through a line 191.

Flue gas may be heated in the exchangers 136 and 138 to a temperature (typically about 800° F.) such that the turbines 169 and 172 produce exactly as much power as required by the compresors 120 and 113. Such an operation uses little or no internal recycle and produces a maximum of primary (usually high pressure superheated) steam.

Alternatively, flue gas may be reheated to a temperature approaching the upper limit allowable for the turbine materials (for example, 1100° F.). In such case, the turbines produce excess mechanical energy which can be transmitted to optional generators 192 and 193 (dashed outline) which convert it into electricity, delivered as an optional product through a conduit 194 (dashed line). Such as operation requires an increased rate of internal recycle which, in turn, decreases the production of primary steam and increases that of secondary steam.

The steps of cooling gaseous products below their dewpoint and separating aqueous condensate containing fine solid particles from relatively dry flue gas are important ones in my invention. Flue gas needs to be comparatively dry (dehydrated) to avoid excessive loss of latent heat in the exhaust from the apparatus. Moreover, it needs to be essentially free of solid particles, which might erode the blades of the turbines and/or vaporized salts which might deposit on the blades. In the embodiment of FIG. 1, cooling, condensation and transfer of solids to the aqueous phase are accomplished in the simplest manner, viz., indirect transfer of heat through the walls of exchanger (or boiler) tubes. Condensation of water droplets in and around fine solid particles (once in the boiler 142 and again in the feedwater heater 143) are capable in most circumstances of cleaning the flue gas adequately.

There is a potential operating problem, however. As water droplets begin to condense they may attract fine particles forming, near the dewpoint location, a non-fluid mixture ("mud") which could cause an obstruction. Where this difficulty has been encountered other process units it has been overcome by intermittent or continuous flushing of the location with an excess of liquid, as from the discharge of the pump 147.

Figure 2:
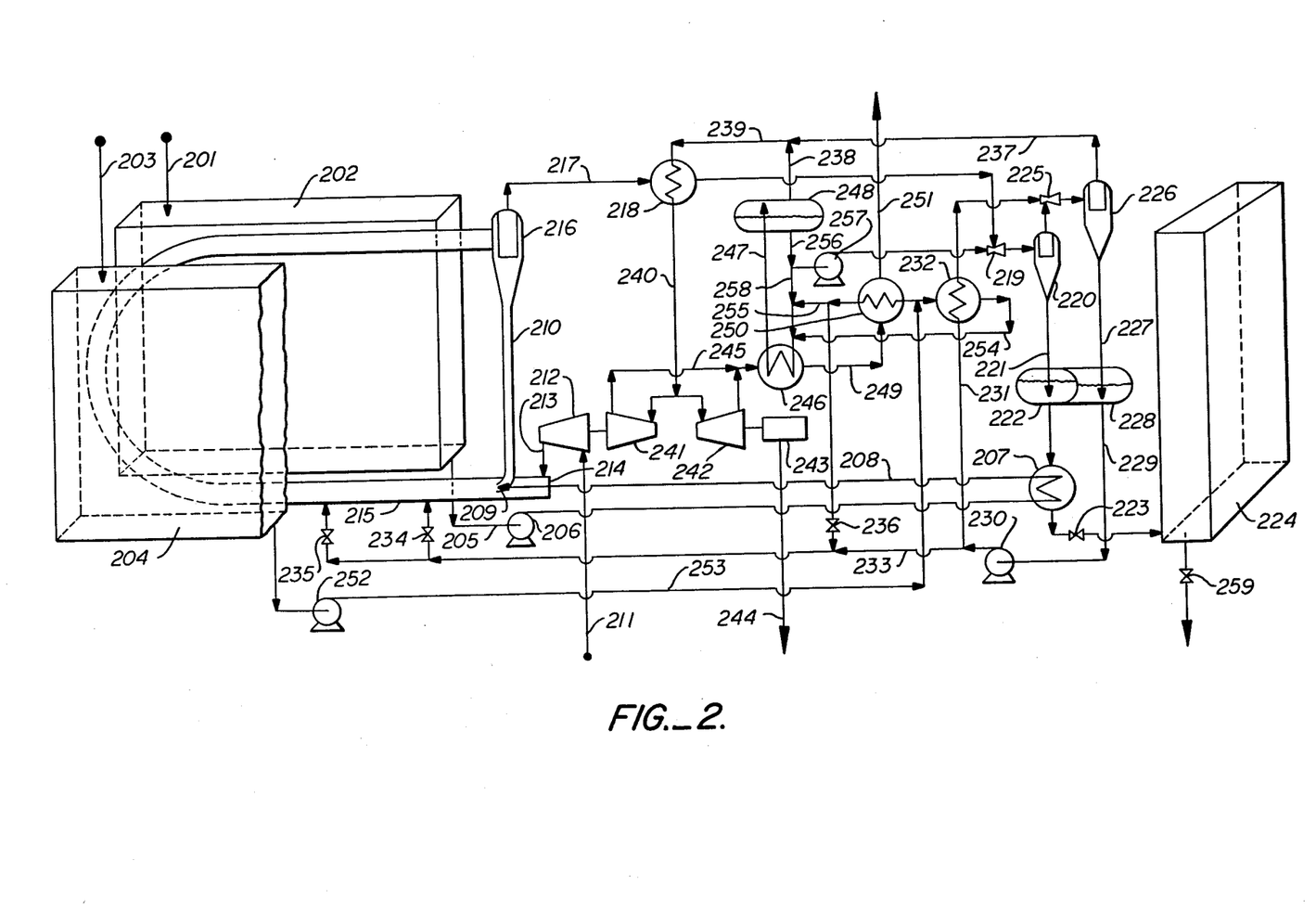
FIG. 2 is a schematic elevational, partially isometric, diagram of an embodiment of the invention utilizing a Circulating Fluidized Bed reactor adapted for locomotive service, in which flue gas and steam in admixture power a turbo-generator.

Moreover, there are alternative means of carrying out these important steps. One of these is illustrated in FIG. 2. Both the first cooling step (to below the dewpoint) and the second (which can also be considered a gas washing step) are carried out by direct contact with cooler water (or condensate recycled through a heat exchanger to cool it appropriately). More than one washing step may be specified for increased assurance of gas cleanliness. This alternative avoids the possibility of "mud" formation near the dewpoint. Another alternative is illustrated by FIGS. 1 and 5 of Patent A and FIGS. 1, 2 and 6 of Patent B. In these embodiments, the second cooling (washing) step is carried out by countercurrent contact with cooled recirculated water in a vertical column known as a flue gas dehydrator. This more complicated alternative is considered to provide the highest assurance of gas cleanliness and relatively pure condensate (distilled water) for cases in which extraneous water of poor quality is substituted for internal recycle.

FIG. 1 represents an embodiment in which heat liberated in the combustion reactor, in excess of that needed to vaporize fuel slurry and internal recycle water and achieve the desired temperature, is absorbed by transfer to feedwater boiling inside tubes within the reactor ("heat transfer embodiments"). In other embodiments there is no heat transfer surface within the reactor and all of the excess heat is absorbed by vaporizing water injected into the reactor, usually, but not necessarily, internal recycle ("water injection embodiments").

FIG. 1 illustrates two stages of air compression, with intercooling between stages, and two stages of flue gas expansion, with reheating between stages. Such heat transfer embodimints may employ one to three stages of compression and usually, but not necessarily, the same number of stages of expansion.

The option of reheating flue gas to a temperature providing a horsepower excess, convertible into product electricity, is available in both types of embodiments.

Although optimum arrangement of heat recovery apparatus may vary from case to case, water injection embodiments generally rely for primary steam production on a boiler in a position equivalent to that of the secondary boiler 142 of FIG. 1. Internal recycle, having a more major role in such embodiments, would usually be separated from uncondensed gases immediately after the primary boiler. (By recycling condensate at a temperature relatively close to the dewpoint, the temperature at which its latent heat is made available is maximized.)

Embodiments of the latter type may, with a suitable spread between combustion and primary steam pressures, produce only primary steam, lower level heat being utilized for feedwater and/or flue gas preheat. However, if a minor production of secondary (lower pressure) steam is acceptable, the spread between combustion and primary steam pressures may be reduced.

With reference to FIG. 2, an alkalized coal slurry is charged, during a locomotive's refueling stop, through a filling connection 201, to a fuel slurry storage tank 202. Similarly, water is charged through a filling connection 203 to a water storage tank 204. When preparing to generate motive power or standing by, fuel slurry from the tank 202 is drawn through a line 205 by a fuel slurry charge pump 206 (which may be of reciprocating instead of centrifugal type as diagrammed). The pump 206 provides sufficient pressure to move the slurry through an ash slurry to fuel slurry preheat exchanger 207, and through a line 208 to a point of discharge at the center line of a recycled solids discharge fitting 209. Hot recycled solids, comprising particles of ash, alkali, spent alkali and, in some cases, unburned fuel, flow into the fitting 209 from a recycled solids standpipe 210.

Atmospheric air, which may be filtered to protect the apparatus from airborne solids by a conventional air filter (not shown), flows through a conduit 211 to the suction of a rotary air compressor 212, which delivers it at an elevated pressure, and a temperature raised by the heat of compression, through a line 213 to a windbox 214. The windbox 214 comprises essentially an extension of an elongated entrained phase combustion reactor 215.

The discharge fitting 209, which is of lesser diameter than, and concentric with, the reactor 215, occupies sufficient of the cross-section of the reactor 215 that the compressed air flowing past it from the windbox 214 is accelerated to a velocity appreciably higher than that existing further downstream in the reactor 215. According to Bernoulli's well-known theorem, this temporary increase in velocity creates a local zone of reduced pressure (venturi effect) which induces the powdered solids to flow from the fitting 209 into the zone and mix, under turbulent conditions, with fuel slurry from the line 208 and compressed air from the windbox 214. Concurrently, the comparatively high heat content of the recycled solids vaporizes the fuel slurry water and raises the temperature of the resulting air-water vapor-solids mixture.

The diameter of the reactor 215 is chosen to provide a relatively high velocity combustion zone such that solid particles remain entrained in, and flow with, the gaseous phase. Fuel particles react with air to release heat of combustion, causing the temperature of the mixture to rise. This temperature is controlled below a predetermined maximum by injecting water through one or a number of connections such as those shown to be regulated by valves 234 and 235.

In FIG. 2, the reactor 215 is illustrated as a U-tube, comprising two horizontal sections connected by an 180 degree bend. A pair of T-fittings, with their in-line branches blanked off, has been found effective in fluidized cat crackers for reversing flow direction of gas-solid mixtures without erosion, and may be substituted for the 180 degree bend. In some cases it may be preferable to use more than two horizontal sections, similarly connected, in order that the assembly may be correspondingly shorter.

Because of rotary compressor characteristics and the necessity to maintain a minimum linear velocity in the reactor 215 so that fuel and recycled solids remain entrained, the combustion may operate, during periods of idling or low load, at reduced pressure and/or relatively high excess air.

After completing their passage through the reactor 215, the gross products of the combustion (comprising net products plus solids to be recycled) discharge into a cyclone separator 216. Utilizing centrifugal force, the separator 216 performs a separation between net products (including ash and spent alkali), which leave by means of a line 217, and recycled solids. The action of the separator 216 increases the density of the separated solids, which drop into the standpipe 210, forming a dense phase. The increased density in the standpipe 210, relative to that in the reactor 215, sets up a hydraulic driving force which establishes a flow downward and through the discharge fitting 209.

Because of height restrictions in a locomotive, the standpipe 210 has to be relatively short, limiting the differential pressure it can develop. It is generally useful, therefore, to supplement the hydraulic differential by a venturi effect, such as previously described, at the point of entrance into the reactor 215. Various known eductor or venturi mixer designs may be used for this purpose.

On the other hand, because of widely varying load demands, it may be desirable to ensure a minimum depth of dense phase in the standpipe 210 by providing a fixed or adjustable restriction device, or a trap or seal, as item 127 of FIG. 1, in its lower part.

The ratio of recycled to net solids may vary over a considerable range, so long as it is sufficient to provide a satisfactorily high temperature at the point of mixing with fuel slurry and air. Burning and attrition tend to decrease the size of solid particles as they circulate through the reactor 215. Since fine particles pass through cyclone separators more readily than large ones, all, or most, eventually leave through the line 217 with gaseous products. However, specifications for the cyclone 216 may provide lower-than-maximum solids collection efficiency, means of adjusting this efficiency, a bypass or a means of "shaving off" a portion of the separated particles. The lower portion of the standpipe 210 may also be equipped with a draw-off for this purpose.

Product gases, carrying net solids products, flow through the line 217 to a flue gas reheat exchanger 218, in which they transfer sensible heat to washed flue gas, and are then quenched with water in a venturi scrubber 219. The amount of water directed to the venturi 219 is sufficient to saturate the combustion products and cool them below their dewpoint. In doing so, considerable of the water is vaporized, augmenting the volume of gases. Unvaporized water, however, is sufficient to scrub solid particles from the gases, forming an ash slurry.

Gases and ash slurry flow together to a separator 220, illustrated as, but not necessarily, of cyclonic type, which separates the slurry to flow by gravity through a tailpipe 221 to an ash slurry accumulator 222, from which it is withdrawn through the exchanger 207, in which it is cooled by indirect exchange with incomong fuel slurry. The level in the accumulator 222 is controlled by a let-down valve 223 which reduces the pressure of the slurry from that prevailing in the pressurized apparatus to near atmospheric. The cooled and depressured slurry is then directed to an ash slurry storage tank 224.

Saturated product gases, from which ash slurry has been separated in the separator 220, flow to a venturi washer 225 in which they are further cooled and washed free of entrained water or slurry by a circulating stream of cooled condensate. Wash water and washed gas are separated in a second gas-liquid separator 226. The water flows by gravity through a tailpipe 227 to a recycle water accumulator 228 from which it flows, via a line 229, to a recycle pump 230. A portion of the discharge of the pump 230 is directed through a line 231 to a condensate-raw water exchanger 232 in which it is cooled before serving as cooling and washing medium in the venturi washer 225.

While the saturated gas might also have been washed with raw water, the quality of make-up water available from place to place is uncertain so that any entrainment from the separator 226 might have caused fouling in the reheat exchanger 218. As illustrated, the circulating condensate is cooled so that it, in turn, can cool the gases being washed and condense therefrom some of their contained water vapor, thus providing a supply of pure wash water.

Because the accumulators 222 and 228 operate under pressure it is necessary to insure that the supply of gas above their liquid levels accomodates the maintenance of those levels within proper operating ranges. This adjustment is provided by vent lines (not shown) connected to a source of gas under suitable pressure, such as the overhead lines of their respective separators.

Excess wash water from the accumulator 228 is delivered by the pump 230 through a line 233 for injection into the reactor 215 as internal recycle, whose functions are to provide a water vapor partial pressure sufficient to convert carbon and suppress sulfur dioxide and to control combustion temperature. The injection points controlled by the valves 234 and 235 are illustrative; in practice a number of such points may be located along the length of the reactor 215. Because of turbulence in the reactor 215, mixing devices at the points of injection are not normally required but, in some cases, may be specified.

If the amount of condensate available from the accumulator 228 is insufficient to accomplish the above functions, it may be supplemented by heated raw water brought in through a valve 236.

Washed gas from the separator 226 in a line 227 is joined by steam from a line 238, generated from flue gas waste heat, the combined gas-steam mixture flowing via a line 239 to the flue gas reheat exchanger 218, in which it is heated to a temperature considered optimum (at the pressure) for recovery of power in gas turbines. The reheated gas flows to the turbine area through a line 240 and is directed to a compressor gas turbine 241, sized to deliver the horsepower needed by the compressor 212, to which it is coupled.

When motive power is required, the flow of fuel slurry to the fitting 209 is increased, raising the temperature and volume of combustion products exiting the reactor 215 and the separator 216. The increased volume and temperature of gaseous products through quenching, washing and reheating steps produces a correspondingly increased flow and temperature in the line 240. Some of the increase may be directed to the turbine 241, raising its rotating speed and horsepower output which, transmitted to the compressor 212, increases the pressure and flow of air to the reactor 215. Consequently, the pressure in all of the pressurized apparatus increases as does the horsepower available from expanding the reheated gas. At such periods of power demand, the flow of water to the injection points along the reactor 215 may also increase, further augmenting with additional water vapor the flow through the apparatus to the turbine area.

The balance of the increased flow in the line 240 is directed to an output gas turbine 242 which delivers its horsepower to a generator 243 which, in turn, supplies electric power through a conduit 244 to motors connected to the locomotive's driving wheels.

The turbines 241 and 242 discharge into an exhaust manifold 245, which takes the gas-stream mixture, now at a pressure slightly above atmospheric, to a waste heat boiler 246 which transfer some of its sensible heat to heated raw water, raising its temperature to the boiling point and converting a portion to steam. The resulting water-steam mixture flows via a line 247 to a steam drum 248, in which water is separated from steam, which flows via the line 238 to mix with washed gas from the line 237. The pressure in the drum 248 may be controlled at a level suitably above that in the line 238 by a control valve (not shown) in the line 238, or may "float" on the pressure in line 237.

Partially cooled gas-stream mixture leaves the waste heat boiler 246 by a line 249 which conducts it to an economizer exchanger 250 in which it receives its final cooling by exchange with raw water before being exhausted to the atmosphere through a vent line 251. Since, under some circumstances, liquid water may condense in the exchanger 250, the vent line 251 preferably contains a separator (not shown), utilizing gravity or centrifugal force to recover condensate for recycling to the tank 204.

Raw water from the tank 204 is pumped by a raw water pump 252 through a line 253 to a point of division between a portion which is heated by exchange with wash water in the exchanger 232 and a portion which is heated by exchange with exhaust gas in the economizer 250. Heated raw water flows as make-up to the boiler 246 through lines 254 and 255, resp. However, some may be diverted through the valve 236 to supplement the supply of reactor temperature control water.

Water separated from steam in the drum 248 leaves by means of a line 256 from which a quench water pump 257 takes suction. The pump 257 delivers to the venturi scrubber 219 the water necessary to saturate combustion products and cool them below their dewpoint.

Although make-up to the waste heat boiler 246 comprises raw water (which has received little or no chemical treatment) scaling of its heat transfer surfaces is minimized by the fact that the rate of withdrawal by the pump 257 (comparable to blow-down in a conventional boiler) is high relative to steam production, so that little concentration of dissolved solids occurs. For operating flexibility a boiler water recirculation connection 258 is shown which, in some cases, may be shut off by means of a valve (not shown), leaving the boiler 246 to operate in a once-through manner.

When the ash slurry storage tank 224 is nearly full, it is drained, during a convenient stop, through a valve 259, into stationary disposal facilities.

Not shown in FIG. 2 are auxiliary systems and equipment, such as those needed to start up the apparatus when cold. These would include a small auxiliary oil or liquid petroleum gas fuel system and burner, or burners, and a source of starting power for the turbo-compressor 212-241.

Figure 3:
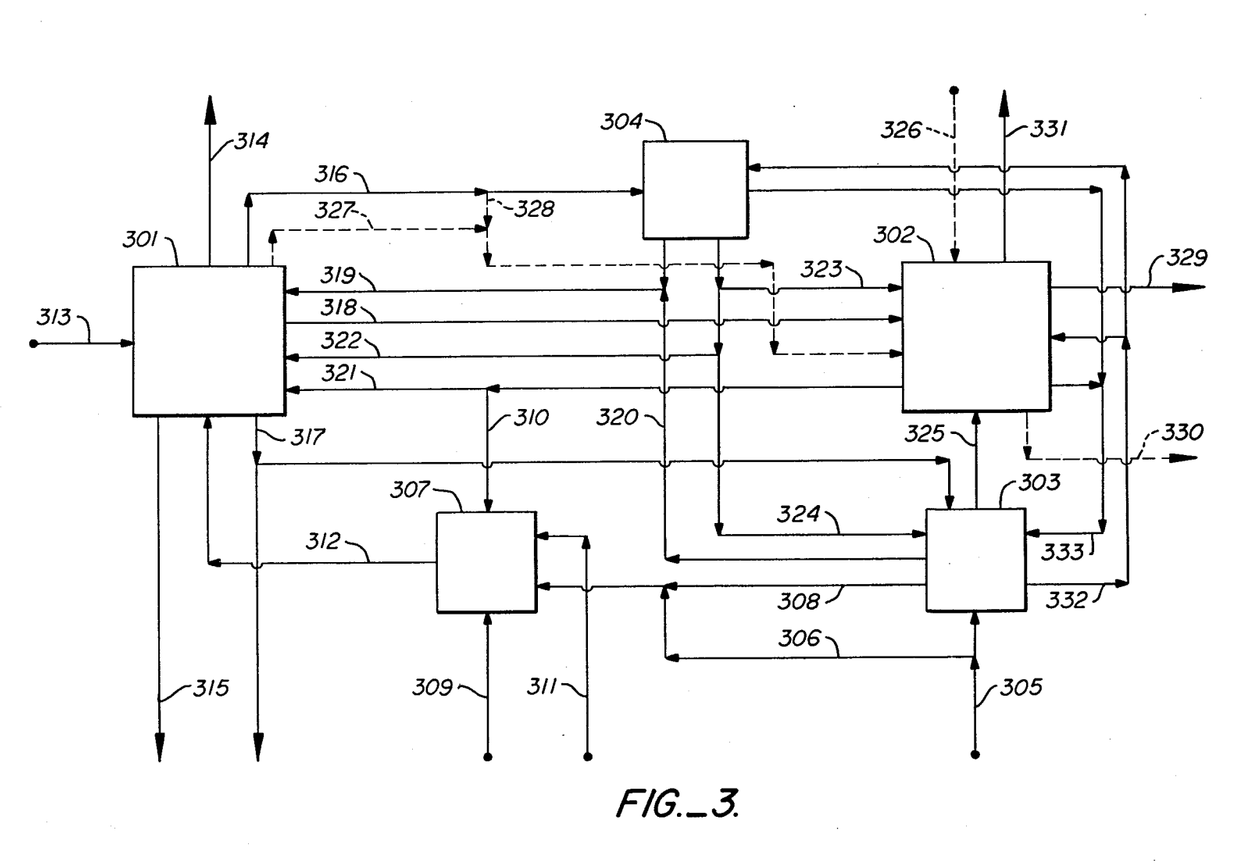
FIG. 3 is a schematic diagram of a combination of the invention with a fuels processing unit, whose contaminated water by-product is utilized as fuel slurry and reactor temperature control water.

With reference to FIG. 3, a combustion apparatus 301, operated in accordance with my inventions, receives contaminated water from, and may supply heat and/or steam to, a thermal and/or oxidative fuel processing apparatus 302. The combustion apparatus 301 also supplies electrical energy to the processing apparatus 302 and offsite facilities 303 by producing steam which is converted to electricity by a condensing turbo-generator facility 304.

The combustion apparatus 301 may comprise an embodiment such as FIG. 1 or FIG. 2 of this application, FIG. 1 or 5 of Patent A or FIGS. 1, 2 or 6 of Patent B, or may utilize features of more than one of them. More suitable in most cases are embodiments which rely largely or entirely upon water injection for reactor temperature control since they have greater capacity for purifying contaminated water.

The fuel processing apparatus 302 may utilize any of the known or new processes of fuel conversion characterized by the production of waste water containing appreciable amounts of organic impurities. It may also be a net consumer of thermal energy which can be satisfied by hot flue gas or flue gas-steam mixture. The conversion may be assisted by oxidation. Such apparatuses may conduct conversions of carbonaceous fuels into coke, char and/or fuel or synthesis gas, retort shale, process naturally occurring asphalts and bitumens or produce them from petroleum residues.

The offsite facilities 303 comprise whatever supporting and/or auxiliary facilities are needed to support the supply, operation and maintenance of the combustion apparatus 301 and the fuel processing apparatus 302. These may include, but are not limited to, offices, laboratories, shops, mines, quarries or the like, unloading, storing and preparing raw fuel, cooling water system, boiler feedwater treating, etc. Insofar as the direct operation of the apparatuses 301 and 302 is concerned, the pertinent functions of the offsite facilities 303 are the supply of fuel and cooling water, cooling and boiler feedwater make-up and consumption of electrical energy.

Raw fuel is supplied from a source 305 to the offsite facilities 303 in which the necessary storage and preparation are performed. Raw fuel may also be diverted through a transfer means 306 to a slurry preparation apparatus 307. Alternatively, fuel stored, or rejected during preparation, may be transferred to the slurry preparation apparatus 307 from the offsite facilities 303 via a transfer means 308.

In the slurry preparation apparatus 307, fuel from the transfer means 306 and/or 308 is ground and mixed with alkali from a conduit 309 and contaminated water from a line 310 to form a fuel slurry. Additional water, which may include boiler and cooling water blowdown, or from any other local source, may flow into the apparatus 307 through a line 311.

Alkalized fuel slurry is pumped via a line 312 to the combustion apparatus 301 in which the fuel is burned as described in connection with FIGS. 1 and 2 and/or the referenced figures of Patents A and B. Air to support the combustion is supplied through a conduit 313. The combustion results in the production of cooled flue gas, which is discharged to the atmosphere through a vent 314, wet or dry ash which is withdrawn through a conduit 315, superheated steam which flows to the turbo-generator facility 304 through a line 316 and purified water which leaves by a line 317. It may also produce a stream of hot, pressurized flue gas or flue gas-steam mixture which is sent via a line 318 and/or saturated steam which is sent via a line 327 to the fuels processing apparatus 302.

Steam condensate is returned from the facility 304 to the combustion apparatus 301 via a line 319 and is supplemented, as required, by treated feedwater make-up from the offsite facilities 303 delivered by means of a line 320. Water for injecting into the combustion reactor for temperature control may be supplied from the fuels processing apparatus 302 through a line 321.

The product of the turbo-generator facility 304 is electricity which is supplied to the combustion apparatus 301 through a conduit 322, to the fuel processing apparatus 302 through a conduit 323 and to the offsite facilities 303 through a conduit 324.

Prepared fuel is furnished to the fuel processing apparatus 302 by a transfer means 325. Atmospheric air may be supplied to the apparatus 302 through a conduit 326. In some cases, saturated steam from the boiler drum of the combustion apparatus 301 may also be supplied to the apparatus 302 by means of the line 327. Alternatively, superheated steam to supply any process steam requirements of the apparatus 302 may be routed via a connection 328.

Gaseous, liquid or solid fuel product of the processing apparatus 302 is removed by a transfer means 329. In the case that the apparatus 302 produces an ash, spent shale or the like, it may be discharged by a transfer means 330. Should the apparatus 302 make use of a heating medium from the combustion apparatus 301, it may be discharged, after transferring its heat, through a line 331. In some cases, gases in the line 331 may have useful heating value and may be directed to an appropriate utilization.

Cooling water is supplied from the offsite facilities 303 as required by the fuels processing unit 302 and the turbo-generator facility 304, through a manifold 332 and returned to the facilities 303 for cooling, treating and recirculation by means of a manifold 333. Although cooling water connections to the combustion apparatus 301 are not shown, they may be installed to supply minor services such as cooling pump glands, etc.

DESCRIPTION OF THE INVENTION

My U.S. Pat. Nos. 4,377,066 (A) and 4,380,960 (B) describe methods of burning coal and other carbonaceous fuels under pressure in the presence of water vapor and alkali. Pressure, water vapor and alkali promote combustion so that essentially complete carbon conversion can be achieved at temperatures lower than normally employed. These conditions, including reduced temperature, combine to direct the chemistry of sulfur compounds almost quantitatively to alkali sulfate, virtually eliminating sulfur dioxide from the flue gas. As is well known, reduction in temperature also decreases the formation of nitrogen oxides so that both gaseous pollutants considered responsible for acid rain may be effectively controlled.

Pressure also decreases the volume of gases to be processed and improves heat transfer coefficients, so that equipmemt is reduced in size and cost. It has the further desirable effect of increasing the dewpoint of combustion products and the temperature level at which latent heat can be recovered and utilized. Condensation of water during heat recovery, on and around particles of ash and other solid products, wets them and effectively removes them from the flue gas. This action eliminates from the flue gas the third major pollutant, "particulates".

These inventions have been termed "supercritical wet combustions". They are wet in the sense that solid fuels are charged as aqueous slurries, and additional water may be injected into the combustion zone to control its temperature. Also, during heat recovery, water vapor in combustion products condenses to liquid water, permitting a thorough wet cleansing of the flue gas. In all embodiments, combustion temperature is predominently or entirely above the critical temperature of water (705.4° F.), hence supercritical with respect to temperature. Pressure, however, may or may not be above water's critical pressure of about 3200 psi. The state of water in the combustion zone is technically "superheated vapor" or "dense phase", depending upon pressure. For convenience, it is referred to herein as steam or water vapor (which terms are used interchangeably).

The invention of Patent B is characterized by combustion zones in which fuel and alkali particles are entrained in an air-water vapor mixture whereas that of Patent A is characterized by fluidized bed combustion zones. As vehicles for accomplishing the objects of the inventions, both reactor types have advantages and disadvantages.

Advantages of the entrained phase reactors of Patent B are:

1. High velocities produce turbulent mixing and, consequently, excellent contact between solid and gaseous phases;

2. Reactors may be as long as necessary to provide sufficient reaction time;

3. Because of the turbulence, large capacity reactors provide as good contacting as smaller capacity ones. In other words, capacity can be "scaled up" successfully;

4. Vessel diameter varies inversely with velocity. The smaller the diameter of a pressure vessel of a given volume, the less its weight and cost;

5. Introduction of fuel slurry and/or air can be staged.

Disadvantages, on the other hand, include:

1. Since all particles remain in the combustion zone the same length of time, the time tends to be determined by larger, or more refractory, particles;

2. A simple entrained phase reactor is essentially adiabatic. The temperature of the inlet zone tends to be low while care must be taken that downstream temperatures do not become too high. In fact, Column 22 of Patent B (line 35) lists four methods of augmenting inlet zone temperature so that a satisfactory initial combustion rate is achieved.

The advantages of fluidized beds are that solids retention time may be comparatively high, so that even larger or more refractory particles are burned; and, because of their isothermal nature, fuel and air preheat are not required (although either or both may be used to recover low level heat which would otherwise be lost).

But the "bubbling-bed" type of fluidized bed also has disadvantages:

1. Gas velocity must be controlled within a narrow range, above which entrainment is excessive and below which the bed tendsto defluidize (slump). Thus, it does not have good "turndown" characteristics;

2. Fuel distribution across the bed is critical. Scaling up to larger capacities entails a corresponding increase in fuel inlets;

3. Fine particles tend to blow out of the bed before being completely converted;

4. Although solids retention time may be long, reaction time for oxygen is extremely short, leading to a tendency to use more excess air;

5. Since allowable velocities are comparatively low, large diameter, and comparatively costly, vessels are rquired;

6. Heat transfer surface in the bed is subject to severe erosion.

Circulating Fluidized Bed Combustors (CFBCs) combine advantages of both entrained phase and bubbling-bed reactors:

1. High velocity combustion zones provide good mixing and scale-up characteristics and have comparatively small diameters;

2. High solids recycle pours heat into the inlet zone so that air and fuel preheat are unnecessary, while providing a "thermal flywheel" to minimize subsequent temperature peaks;

3. Solids retention is long so that high conversions are attained without high excess air, temperature or combustor length;

4. Air introduction can be staged, a recognized method of minimizing nitrogen oxides;

5. Heat transfer surface in contact with high solids loadings may be confined to wall tubes parallel to the flow and relatively free from erosion.

Six variations of fluidized bed combustors are illustrated in Patent A. Of these, FIGS. 3, 7 and 8 have high velocity, entrained phase combustion zones. In FIGS. 3 and 8 they are combined with lower velocity zones characterized by interfaces between dilute and dense phases (more-or-less equivalent to a bubbling-bed). In both cases there is a definite solids recirculation path, although it is internal.

FIG. 1 of the present application utilizes a pressurized CFBC. Since virtually all the combustion takes place under entrained phase conditions, the combustion zone is comparable to those of Patent B. At the same time, recycle of hot solids gives it the essentially isothermal characteristic of a fluidized bed. Satisfactorily high inlet zone temperature is thereby maintained without the necessity for air preheat.

Of the means listed in Patent B for augmenting inlet zone heat input, the fourth, item (d), is "recycling of hot combustion products". To these means may now be added: "(e) recycling of hot solids separated from combustion products".

Although the CFBC diagrammed in FIG. 1 resembles a particular commercial design, other patterns and arrangements proven in atmospheric service may also be used. For example, the standpipe 126 be enlarged for part of its length to accomodate heat transfer surface, which would cool the recirculated solids, lessening the duty to be performed by the wall tubes inside the reactor 110. The flow through the cyclone 125 and the standpipe 126 may be divided into parallel cyclones and standpipes, one of which may contain heat transfer surface. Heat might similarly be recovered from the dense phase solids withdrawn through the line 130 and/or the line 131, before they reach the eductor 156. Part or all of the fuel slurry may join the recycled solids between the seal 127 and the inlet zone of the reactor 110.

The Coal-Water Fuels (CWF) being tested at the time of this application have the limited objective of enabling furnaces and boilers designed for oil and gas to substitute a coal-based fuel. In keeping with the general belief that fuel moisture has to be restricted, in the interests of flame stability and thermal efficiency, water contents are held to a range of about 25–30 percent. To secure satisfactory fluid properties with so little water, the coal must be ground to strict particle size specifications and treated with expensive chemical stabilizers.

Since such furnaces and boilers are not ordinarily equipped to process much fly ash or remove sulfur dioxide, premium coals, low in ash and sulfur, must be specified and/or strenuous beneficiation undertaken to minimize these impurities. Even so, boilers must be derated, relative to capacity with oil or gas, and suffer loss of thermal efficiency. Moreover, a baghouse or precipitator must be added to control particulate emissions. Sulfur dioxide emissions, a function of the coal as slurried, are, in most cases, borderline.

With limited objectives and all these drawbacks and expenses, it is not surprising that CWFs have not gone into commercial use at the time of this application.

In sharp contrasts to the known CWF art, the processes of my inventions place no restrictions on sulfur, ash, or slurry water. Particle size need only be suitable for pumping to combustion pressure. No stabilizers are required. Thermal efficiencies are high (latent heat loss usually being no greater than from dry combustions). Yet, emissions of sulfur and nitrogen oxides and particulates can be but a fraction of current regulations.

Because of these characteristics, my processes form particularly advantageous combinations with coal slurry pipelines. Instead of the conventional steps of dewatering and drying, entailing the necessity to dispose of contaminated water, coal slurry is charged as received, after only adjustment of alkali content. The equivalent of slurry water can be recovered as valuable distillation purified water.

In the processes of Patents A and B, and the present application, sulfur chemistry may be represented by the following equations:

1. $S + O_2 \longrightarrow SO_2$

2. $SO_2 + \tfrac{1}{2}O_2 \rightleftharpoons SO_3$

3. $SO_3 + H_2O \rightleftharpoons H_2SO_4$

4. $H_2SO_4 + CaCO_3 \longrightarrow CaSO_4 + H_2O + CO_2$

Equation 1. represents the nominal combustion of a complex sulfur-containing compound. The high temperature, low pressure, dry conditions of conventional combustion yield sulfur dioxide ($SO_2$) predominently.

Equation 2. represents the further oxidation of the dioxide to the trioxide ($SO_3$). Unlike Equation 1., it is an equilibrium reaction which can go either way. $SO_3$ is favored by low temperature, high partial pressure of oxygen and low partial pressure of $SO_3$.

Equation 3. represents the hydration of the trioxide to sulfuric acid ($H_2SO_4$). It is also an equilibrium reaction. $H_2SO_4$ is favored by low temperature, high pressure, high partial pressure of $H_2O$ and low partial pressure of $H_2SO_4$.

Equation 4. represents the neutralization of sulfuric acid by an alkali, illustrated by calcium carbonate, or limestone ($CaCO_3$). It is a non-equilibrium (irreversible) reaction which goes to the complete consumption of one of the reactants. Maintaining an excess of alkali guarantees that $H_2SO_4$ will be completely neutralized.

Note that the conditions in which the subject processes differ from conventional: higher pressure, lower temperature, positive water vapor partial pressure, excess alkali, all drive equations 2.–4. toward the right. The Law of Mass Action operates as follows to remove sulfur dioxide almost completely from flue gas: Equation 4. eliminates $H_2SO_4$; Equation 3. is, therefore, forced to the right by low temperature, high pressure, high water vapor partial pressure and absence of $H_2SO_4$; Equation 2. is forced to the right by low temperature, high pressure, high oxygen partial pressure and absence of $SO_3$, virtually eliminating $SO_2$.

But, from a more rigorous standpoint, there are no irreversible reactions. The term is applied to reactions for which, at conditions normally encountered, the reverse reaction is negligible. In other words, at conditions not normally encountered (specifically, high temperatures), the reverse reaction can be appreciable.

When I filed the applications which became Patents A and B, I had no means of determining quantitatively the extent to which Equation 4. is reversed at a particular temperature (which would lead, through reversible reactions 3. and 2., to production of appreciable sulfur dioxide). I had to rely on estimates that above 1600° F. and below three atmospheres water vapor partial pressure, sulfur dioxide levels might be unsatisfactory.

Since the issuance of Patents A and B, the National Bureau of Standards has made available its UNIVAC 1100 computer which, with a NASA program developed for rocket research, known as CEC 71, has permitted rigorous computation of equilibrium contents of sulfur and nitrogen oxides at selected conditions of temperature, pressure, excess air, excess alkali and water vapor pressure. The fuel selected for this study was an Illinois No. 6 coal of the following composition:

| | |
|---|---|
| C | 59.7 Wt. % |
| H | 4.4 |
| O | 8.4 |
| N | 1.0 |
| S | 3.9 |
| Ash | 9.6 |
| Water | 13.0 |

Dry flue gas from burning the above fuel conventionally would have a sulfur dioxide content of about 3600 ppm, which could be reduced by scrubbing conventionally with limestone slurry (at considerable expense) to about 360 ppm, barely able to meet 1985 emission regulations.

However, when burned according to my inventions, as a slurry containing 25 percent excess limestone, with 10 percent excess air in an air-water vapor mixture containing 24 weight percent water vapor (including vaporized slurry water), the computed equilibrium contents of sulfur oxides in dry flue gas, in ppm, are as follows (TABLE 1)

| | P, psig | | | |
|---|---|---|---|---|
| T, °F. | 0 | 100 | 1000 | 5000 |
| 1500 | 0.0023 | 0.00034 | 0.00016 | 0.00012 |
| 1800 | 2.39 | 0.115 | 0.010 | 0.006 |
| 2100 | 464 | 21.68 | 0.87 | 0.14 |

Corresponding partial pressures of water vapor at the outlet of the reactor are (Table 2):

| P, psig | Partial Pressure, Atmospheres |
|---|---|
| 0 | 0.38 |
| 100 | 2.93 |
| 1000 | 25.9 |
| 5000 | 128.1 |

These equilibria are evidence of the surprising effectiveness of pressure, alkali, water vapor and reduced temperature in suppressing this main precursor of acid rain, from even high sulfur coals. Equilibrium is, of course, an ideal condition, approached but not equaled in practice. Moreover, additional reaction, or reversal, can occur as temperatures fall during heat recovery, particularly under pressure and in the presence of water and free alkali. Nevertheless, in combustion generally, equilibrium is a good guide. As such, the computations indicate that the estimates upon which Patents A and B were based were too conservative.

It is widely held that current regulations, from health and environmental standpoints (particularly acid rain), are unsatisfactorily high. Commercial availability of my inventions will undoubtedly permit a tightening of the regulations, but the quantitative level of future standards is unknown.

By interpolation of the computed data, an apparatus burning Illinois No. 6 coal, according to my inventions, can theoretically meet a sulfur oxides regulation of 4 ppm (about one percent of the 1985 standard) at any of the following combinations of temperature and water vapor partial pressure (Table 3):

| | |
|---|---|
| 2100° F. | 139 Atmospheres |
| 2000 | 43.6 |
| 1900 | 14.5 |

-continued

| | |
|---|---|
| 1800 | 4.9 |
| 1700 | 1.8 |

At temperatures of about 1700° F. and below, the necessary partial pressure of water vapor may be determined more by carbon conversion and/or slurry water necessary to pump the fuel to operating pressure, than a sulfur oxides specification of 4 ppm.

It will be apparent from Table 1 that sulfur oxide specifications as low as 1 part per billion (ppb) are possible, at various combinations of temperatures below about 1700° F. and pressures above about 100 psig.

A coal with a sulfur content higher than Illinois No. 6 (3.9%) will require a proportionate increase in alkali and either slightly higher water vapor partial pressure or lower temperature, or some combination thereof, to reach the same low flue gas sulfur oxides content.

So far as combustion equilibria can predict, the prospects for very low contents of nitrogen oxides are not as optimistic. Temperature is the predominent factor, with pressure playing a lesser role. Water vapor (except insofar as it effects temperature) is not helpful. With the same fuel, 10% excess air, 25% excess limestone and an air-water vapor mixture containing 24 weight percent water vapor, equilibrium $NO_x$ contents are as follows (TABLE 4)

| Temp., °F. | 0 psig | 100 psig | 1000 psig | 5000 psig |
|---|---|---|---|---|
| 2100 | 414 | 415 | 421 | 432 |
| 1800 | 150 | 151 | 155 | 163 |
| 1500 | 40 | 41 | 44 | 48 |
| 1200 | 7 | 7 | 8 | 11 |

Assuming a close approach to equilibrium, the EPA target of 150 ppm wil permit a temperature, under the above conditions, of 1800° F., or slightly less. In the preferred temperature range of 1200°-1500° F., predicted $NO_x$ concentrations would be only some 10-50 ppm.

The total production of nitrogen oxides is from two sources: decomposition of organic nitrogen compounds in the fuel, which is called "fuel $NO_x$" and fixation of nitrogen in the combustion air, which is called "thermal $NO_x$". It is known that fuel $NO_x$ can be reduced by staging the introduction of air into the combustion zone. The physical arrangement of CFBCs is suitable for introducing primary air below the fuel and solids recycle inlets, and secondary air above those inlets.

Since the production of sulfur oxides from a combustion apparatus, operated according to my inventions, is so low, it may be advantageous to utilize combustion temperatures as high as 2000°-2100° F., at which the production of nitrogen oxides, although about the level of current regulations, would be scant improvement over the present art. In such case, the combustion could be followed by $NO_x$ reduction by one of the known technologies, such as catalytic, or non-catalytic, reaction with ammonia or urea. The elevated pressure, characteristic of my inventions, would expedite the chemistry and could well make the expense of catalyst unnecessary.

With heat transfer embodiments, product steam may be generated at any desired pressure, regardless of combustion pressure. If this method predominates, pressure must be high enough to suppress sulfur dioxide at the selected temperature and water vapor concentration but, otherwise, may be determined by conventional optimization. A range of 100-500 psi would be typical. Some of the latent heat in combustion products can be utilized as feedwater preheat but, usually, a minimum amount is delivered as low pressure steam or process heat.

FIG. 1 diagrams an embodiment utilizing the heat transfer method. The embodiments of FIG. 5 of Patent A and FIG. 6 of Patent B also relay on this method. In general, the moderate pressure range of such embodiments tends to make them preferred for small to medium installations. The "by-product" of low pressure steam or process heat frequently fits in well where cogeneration is appropriate.

With the water injection method, generation of high pressure steam requires relatively high operating pressure. For example, to generate 2000 psi steam, a pressure of 4000 psi is suitable (not necessarily optimum). Lower steam pressures permit correspondingly lower operating pressures. With an appropriate differential between steam and operating pressures, there need be no by-product low pressure steam or heat. On the other hand, if some by-product steam is acceptable, the differential may be reduced.

With a particular fuel, the amount of injection water needed to maintain a given temperature depends primarily upon that temperature and, secondarily, upon the pressure and water temperature. Energy balance dictates that more must be injected to control the temperature at 1200 degrees than at 1900 degrees. Other circumstances being the same, one cannot establish as high a water vapor partial pressure at 1900° F. as at 1200° F. Since sulfur dioxide formation is unfavorably influenced both by increase of temperature and decrease of water vapor pressure, one must take account of both factors when settling combustion temperature. For example, a partial pressure of 139 atmospheres might not be possible at 2100 degrees (Table 3), with a particular fuel and pressure. To satisfy the energy balance in such a case, with an equilibrium content of 4 ppm, both temperature and water vapor partial pressure would have to be lower.

The cycle comprising generation of product steam, its utilization in a condensing turbine and return of condensate as boiler feedwater, is sometimes referred to as a "steam loop". Water injection embodiments can be considered to have an "internal steam loop". In this respect, these embodiments are comparable to an atomic power system, in which there is an internal loop of steam and condensate contaminated with radioactive by-products, which transfers heat to an uncontaminated (product) steam loop. Instead of radioactivity, my internal loop is contaminated with flue gas and fine solid particles.

As described in Cols. 28 and 29 of Patent B, the internal water distillation cycle (or loop) can be utilized to purify extraneous water. Any water of poor quality is merely substituted for that which would have been recycled internally (utilizing appropriate heat exchange for economy). In fact, such an embodiment can produce its own boiler feedwater, requiring only deaeration and the customary additives.

Numerous industrial processes, including thermal and/or oxidative processing of carbonaceous materials such as coal, lignite, shales, wood and petroleum residues, result in the inadvertent production of waste waters containing complex organic compounds. Such waste waters are often difficult and expensive to treat to acceptable quality for disposal. Processes of this kind, and facilities associated with them, usually consume considerable energy and/or process steam. My combustions form uniquely advantageous combinations with such processes, being capable of converting their waste waters, as described above, into essentially pure distilled water. In so doing, the heating value of the organic contaminents is recovered, in some cases an appreciable energy bonus. Concurrently, heat and/or steam (or mechanical or electrical energy produced from them) may be supplied to meet the energy requirements of the process and associated facilities. A combination of this general nature is diagrammed in FIG. 3.

Heat may be supplied to one of the above processes through indirect heat exchange with steam or hot flue gas produced according to my inventions. However, a further unique advantage may be realized in the case of pressurized processes to which heat can be transferred by direct contact with materials being processed. It is usually possible to design the combustion apparatus for a pressure conveniently higher than that of the process requiring heat, so that a heating medium, such as hot flue gas or flue gas-steam mixture, can flow to it without mechanical assistance. Clean flue gas may be supplied, as from the line 168 or the line 171 of FIG. 1. Alternatively, clean flue gas-steam mixture may be supplied, as from the line 240 of FIG. 2.

A simpler alternative is available for direct heating where a small input of fine ash is acceptable, as may be the case with certain coking and gasification processes. Hot gaseous combustion products can be diverted, as from the line 132 or the line 139 of FIG. 1, or the line 217 of FIG. 2. In all such cases, the extent of diversion is limited to the amount of hot fluid in excess of that necessary to supply the turbo-compressor(s) and would detract proportionately from the power production delivered, for example, by the conduit 194 (FIG. 1) or the conduit 244 (FIG. 2).

As a means of generating high pressure steam, water injection embodiments, because of their comparatively high operating pressures, tend to be seen as most suitable for large installations, such as thermal power stations. The embodiments of FIG. 1 of Patent A and FIGS. 1 and 2 of Patent B correspond with such field of application. These embodiments are not, however, confined to delivering energy as pure steam and/or electricity. They are also capable of delivering energy in the form of clean, hot, pressurized flue gas-steam mixtures. Among energy consumers for which such form may be advantageous are: (1) pressurized high temperature processes, as described above, (2) gas turbine prime movers, such as for locomotives and (3) enhanced oil recovery (EOR).

The embodiment of FIG. 2 of this application exemplifies Category (2). This railway locomotive embodiment represents a less-than-ideal cycle in that steam (mixed with flue gas) is expanded only to atmospheric pressure instead of the vacuum to which (in pure form) it is theoretically capable. However, the cycle does have the virtue of simplicity and all of its components can be fitted into the shape and space limitations of a locomotive frame. Such a locomotive can operate only over a route equipped with properly located stations at which water and pre-prepared alkalized coal slurry are in place, some of which are also equipped to receive and dispose of ash slurry.

Because the processes of my inventions provide for wet cleansing of flue gas, turbines are not subject to the severe blade erosion and deposits which defeated earlier attempts to develop a coal-fired gas turbine locomotive. Emissions of sulfur and nitrogen oxides, as well as particulates (evidenced as smoke), will also be well within forseeable regulations.

FIG. 2 illustrates compression of combustion air by means of a single-stage turbo-compressor. Heat of compression therefore limits combustion pressure to a maximum of about 125 psi, probably adequate for short to medium haul service. (Since the combustion is tolerant of water vapor, it is theoretically possible that a single-stage compressor with internal cooling by water injection, capable of higher discharge pressure, could be utilized.) On the other hand, locomotives for long haul service may justify the added complication and expense of two-stage compressors (cooling the air and reheating the flue gas between stages) which would permit combustion pressures in the range of 350–550 psi. Such an embodiment would develop considerably greater pulling power and have improved thermal efficiency.

As is well known, pure steam can be condensed under vacuum by indirect exchange with cooling water or atmospheric air. This procedure has two useful virtues: it increases the expansion ratio, and hence energy potential, available to the turbine and it recovers, as condensate, pure water which can be recycled to the boiler, minimizing the expense of treating raw make-up water.

While a locomotive is not likely to afford the space for a cooling water system, air cooled vacuum condensers (of which there are dry and wet types) are a possibility. Because of the range of air temperatures, velocities and humidities which may be encountered, as well as dust and variable water quality, it is not clear that they are a practical apparatus for locomotive service. If so, locomotives can also utilize versions of previously described embodiments which produce pure steam. FIG. 1 is such an embodiment. A condensing steam turbo-generator would supplement, or replace, the electricity produced by the generators 192 and 193. In locomotive service, it would rely on fuel slurry prepared at a stationary location and probably utilize a horizontal combustion reactor and direct contact condensing and gas washing, more-or-less as in the embodiment of FIG. 2.

Service requirements of enhanced oil recovery (Category 3), and the application of my solid fuel combustions thereto, have been described in Patent B (Cols. 2, 3 and 26). Of the subject improvements, the CFBC type of combustion apparatus and the higher combustion temperature range afford potential gains in flexibility and thermal efficiency. With minor modifications, the embodiment of FIG. 2 illustrates an apparatus suitable for delivering clean, hot, flue gas-steam mixture to an underground formation as a source of both heat and gas pressure.

Modifications to FIG. 2 for EOR applications may comprise:

1. Although fuel slurry might be delivered by tank truck to a storage tank at site, it might alternatively be prepared at site, as in FIG. 1, utilizing contaminated water produced with recovered oil;

2. Make-up water to the storage tank 202 could also be locally available contaminated water;

3. Since head room is not likely to be limiting, a vertical CFBC, as illustrated in FIG. 1, may be preferred;

4. Combustion pressure would need to be nominally higher than that required to deliver the product fluid to the formation, probably requiring a multi-stage air compressor, as in FIG. 1, probably powered by a multi-stage turbine;

5. While the equivalent of the turbo-generator 242-243 might be retained to provide site electricity, its capacity would be reduced in proportion to the hot fluid diverted, as from the line 240, for EOR purposes.

As pointed out in Patent B, substitution of oxygen for combustion air results in production of comparatively pure, pressurized carbon dioxide instead of flue gas. Likewise, carbon dioxide-steam mixtures may be produced instead of flue gas-steam mixtures. Both of these products, which have important EOR applications, are available from embodiments incorporating the presently-described improvements.

Ship propulsion represents a further advantageous application of my inventions. Because of an abundant supply of cooling water, embodiments for ships will probably resemble that of FIG. 1 more than that of FIG. 2. Main source of propulsion energy would be superheated steam, as from the line 183, by means of a conventional condensing steam turbine cycle (external steam loop). The gas turbines 169 and 172 might be arranged for delivering supplemental energy, either for propulsion or for auxiliary use, such as the shipboard electrical system. On the other hand, restricted head room might make preferrable a horizontal reactor (or reactors), such as item 215 of FIG. 2, and/or a direct contact final flue gas cooling and washing, such as that performed in the items 219-232 of FIG. 2. Ash slurry would, except when in port, be discharged into the sea.

With special attention to materials of construction, the water purification feature, previously described, can be used to convert sea water to fresh distilled water, saving space and weight for more valuable cargo.

Gas turbine engines, driven buy clean, hot, pressurized gas-steam mixtures, produced in accordance with my inventions, are not limited to mobile applications, but may be of utility at any location where mechanical and/or electrical energy is required and solid fuel and alkali available. Examples are peak load and intermittent energy needs and sites at which fuel is so inexpensive that high thermal efficiency is not justified. They are particularly advantageous in situations where water is scarce and/or of poor quality.

Having described my invention, I claim:

1. A continuous combustion process comprising pressurizing an aqueous slurry of fuel particles containing alkali in an amount at least the chemical equivalent of the sulfur in the fuel particles;
   pressurizing an oxygen-containing gas;
   mixing the pressurized fuel slurry, the pressurized oxygen-containing gas and particles of recycled solid products in an inlet zone of an elongated reactor to form a mixture comprising a gaseous phase of oxygen-containing gas and water vapor in which the particles of fuel, alkali and recycled solid products are entrained;
   permitting combustible portions of the fuel particles to burn at a temperature not exceeding 1600° F. as the mixture flows from the inlet zone to a reactor outlet while maintaining a partial pressure of water vapor of at least 3 atmospheres, as measured at the outlet, forming a reactor effluent comprising gaseous products in which particles of net and recycled solid products are entrained;
   passing the effluent through a gas-solids separating device, forming gaseous products carrying fine particles of unseparated solid products and separated net and recycled solid particles;
   returning the recycled portion of the separated solid particles to the inlet zone;
   withdrawing the net portion of the separated solid particles;
   cooling the gaseous products containing the unseparated particles at essentially combustion pressure, by extracting useful heat therefrom, to a temperature below their dewpoint, forming a flue gas and a fines slurry containing the unseparated solid particles.

2. A process as in claim 1 in which a water vapor pressure of at least 1 atmosphere is maintained in the reactor, as measured at the reactor outlet.

3. A process as in claim 2 in which the combustible portions of the fuel particles are permitted to burn at a temperature not exceeding 2100° F.

4. A process as in claim 3 in which the temperature in the reactor is maintained below a predetermined maximum by extracting heat through heat transfer surface from the mixture flowing from the inlet zone to the reactor outlet.

5. A process as in claim 3 in which the temperature in the reactor is maintained below a predetermined maximum by extracting heat through heat transfer surface from the separated solid particles prior to returning the recycle portion to the inlet zone.

6. A process as in claim 3 in which the temperature in the reactor is maintained below a predetermined maximum by injecting water into the mixture flowing from the inlet zone to the outlet.

7. A process as in claim 3 in which the withdrawn net separated solid particles are mixed with a portion of the fines slurry, which displaces the gases accompanying the solid particles, forming therewith an ash slurry, the displaced gases being separated from the ash slurry and returned to the pressurized portion of the apparatus.

8. A process as in claim 3 in which at least a portion of the water used to prepare the aqueous fuel slurry is a by-product from a fuels processing apparatus.

9. A process as in claim 3 in which ammonia is injected into partially cooled gaseous products in an amount at least the molal equivalent of the nitrogen oxides contained therein.

10. A process as in claim 3 in which the pressure of the combustion is in excess of that existing in an underground oil-bearing reservoir to which a portion of the flue gas is directed.

11. A process as in claim 3 in which the flue gas is reheated by indirect exchange with the gaseous products and at least a portion of the reheated flue gas expanded through a turbine which produces useful mechanical energy.

12. A process as in claim 6 in which at least a portion of the water injected into the mixture is comprised of fines slurry.

13. A process as in claim 6 in which at least a portion of the water injected into the mixture is a by-product from a fuel processing apparatus.

14. A process as in claim 6 in which at least of a portion of the useful heat extracted from the gaseous products is utilized to supply at least a portion of the energy consumed by the fuels processing apparatus.

15. A process as in claim 10 in which the oxygen-containing gas comprises at least 90 percent oxygen.

16. A process as in claim 11 in which the flue gas being reheated and expanded through the turbine is augmented by steam generated from waste heat in the turbine exhaust.

17. A process as in claim 14 in which at least a portion of the useful heat being supplied to the fuels processing apparatus is transferred by direct contact between the gaseous products and the fuel being processed.

18. A process as in claim 14 in which at least a portion of the heat being supplied to the fuels processing apparatus is transferred by direct contact between flue gas reheated by indirect exchange with gaseous products and the fuel being processed.

* * * * *